United States Patent [19]
Winokur

[11] Patent Number: 5,845,291
[45] Date of Patent: Dec. 1, 1998

[54] COMPUTER WITH REDUCED POWER CONSUMPTION

[75] Inventor: Alex Winokur, Haifa, Israel

[73] Assignee: International Business Machines Corp., Armonk, N.Y.

[21] Appl. No.: 800,900

[22] Filed: Feb. 12, 1997

[30] Foreign Application Priority Data

Feb. 20, 1996 [GB] United Kingdom .................... 9603529

[51] Int. Cl.⁶ .................................................. G06F 13/00
[52] U.S. Cl. ..................................... 707/200; 395/750.06
[58] Field of Search ........................ 395/750.05, 750.06; 707/200, 204

[56] References Cited

U.S. PATENT DOCUMENTS

| | | | |
|---|---|---|---|
| 5,481,733 | 1/1996 | Doulglis ................................. | 395/750 |
| 5,493,670 | 2/1996 | Doulglis et al. ........................ | 395/750 |
| 5,535,399 | 7/1996 | Blitz et al. ............................. | 395/750 |
| 5,551,008 | 8/1996 | Saito ....................................... | 395/488 |
| 5,606,529 | 2/1997 | Honma et al. ..................... | 365/230.03 |
| 5,638,541 | 6/1997 | Sadashivaiah ......................... | 395/750 |
| 5,649,212 | 7/1997 | Kawamura et al. .................... | 395/750 |
| 5,717,886 | 2/1998 | Miyauchi ................................ | 395/430 |

OTHER PUBLICATIONS

Marsh et al. "Flash Memory File Caching for Mobile Computers" Proceedings of the Twenty–Seventh Annual Hawaii International Conference on System Sciences, pp. 451–460. May 1994.

Harris et al. "Technology Directions for Portable Computers" Proceedings of the IEEE, vol. 83, No. 4, pp. 636–657. Apr. 1995.

*Primary Examiner*—Thomas G. Black
*Assistant Examiner*—Michael J. Wallace, Jr.
*Attorney, Agent, or Firm*—George E. Grosser

[57] ABSTRACT

A computer is disclosed having a semiconductor memory; a disk data storage device of the type which automatically switches to a low power consumption mode when disk access is not required; and means for associating an application program with a plurality of data files which are usable by the application. The computer is arranged to load the plurality of data files from the disk data storage device into the semiconductor memory before use of the application and to save at least any modified ones of the plurality of files back to the disk data storage device after use of the application. In this way, access to the disk data storage device is not required during use of the application program, thereby reducing power consumption of the device.

8 Claims, 2 Drawing Sheets

COMPUTER WITH REDUCED POWER CONSUMPTION

TECHNICAL FIELD

The invention relates to computers and, more particularly, to reducing power consumption in computers, particularly, but not exclusively, in battery-powered and/or portable computers.

BACKGROUND ART

The popularity of portable battery-operated computers has made the need to reduce the power consumption of computer systems very important. This is because the capacity of batteries is limited and it is desirable to maximise the amount of time for which the portable computer can be used without having to be connected to a utility power receptacle in order to recharge the batteries.

In addition, increased attention to environmental and ecological considerations has given rise to the requirement to design desktop personal computers with reduced energy consumption.

Since it usually has moving parts, the disk sub-system of such computers is very often a major contributor to the power consumption of the device as whole. To save energy, when disk access is not required some modern disk data storage devices have a low power consumption mode, in which, for instance, the disk rotation is stopped. Other methods of reducing power consumption of the disk storage device may also be employed, such as shutting off power to electronic circuitry in the device. Only when data has to be written to or read from disk is the disk started up. The energy required to set a disk in motion is much greater than the energy needed to maintain the disk at its normal rotation speed. Thus, for disk systems which employ this strategy it is very important to minimize the number of times the drive has to be activated.

This invention is directed to the problem of reducing the power consumption of computers comprising a disk data storage device of the above described type.

DISCLOSURE OF THE INVENTION

This invention provides a computer having a semiconductor memory; a disk data storage device of the type which automatically switches to a low power consumption mode when disk access is not required; and means for associating an application program with a plurality of data files which are usable by the application, characterised in that the computer is arranged to load the plurality of data files from the disk data storage device into the semiconductor memory before use of the application and to save at least any modified ones of the plurality of files back to the disk data storage device after use of the application so that access to the disk data storage device is not required during use of the application program.

The means for associating the plurality of files with the application program can be a table or the plurality of files can be associated with an application by means of an application-specific portion of a file name, such as a suffix, or in any other suitable way.

The invention is based upon the observation that the data files of most applications are of the order of several Kbytes in size, while the memory size of a typical modern personal computer is at least 4 Mbytes. Thus in most cases, it will be possible for the computer to be arranged so that all possible files an application might need can be copied into semiconductor memory upon loading of the application. Furthermore, in most modern personal computer operating systems only one application may run in a single window at a time. Therefore, all file swapping from a previous application to a new application may be done while loading a new application. Since most of the other information required during operation, such as disk directories or the like, is preloaded to semiconductor memory at IPL time, the system can be arranged so that no other disk accesses are required during use of an application.

The above described arrangement therefore reduces the number of required disk activations and therefore reduces the overall power consumption of the computer.

In a preferred implementation the computer is battery-powered and/or portable.

Viewed from another aspect there is provided a method of executing an application program in a computer having a semiconductor memory; a disk data storage device of the type which automatically switches to a low power consumption mode when disk access is not required; and means for associating an application program with a plurality of data files which are usable by the application, comprising the steps of loading the plurality of data files from the disk data storage device into the semiconductor memory before use of the application and saving at least any modified ones of the plurality of files back to the disk data storage device after use of the application so that access to the disk data storage device is not required during use of the application program.

BRIEF DESCRIPTION OF DRAWINGS

An embodiment of the invention will now be described by way of example only with reference to the accompanying drawings, wherein.

BEST MODE(S) FOR CARRYING OUT THE INVENTION

Figure 1:
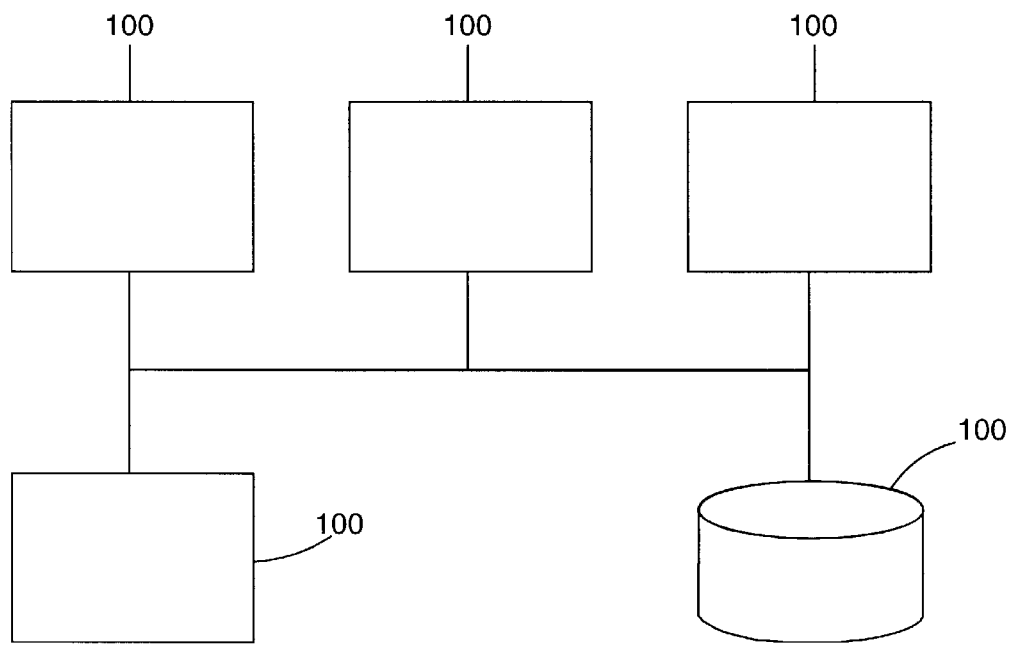
FIG. 1 is a schematic representation of a computer system.

Referring to FIG. 1 there is shown a schematic representation of a computer system according to the invention. The computer system comprises CPU 100, dynamic random access semiconductor memory (RAM) 110, a read only memory (ROM) 120 and disk data storage device 130. The computer also comprises i/o and user interface components such as a display device, keyboard and mouse, shown generally at 140. It will be appreciated that the computer may also comprise other components of known type such as communications adapters, modems or the like. The various system components are interconnected by a bus system 160.

In the preferred embodiment, the computer is a portable computer which can be powered in known manner by a rechargeable battery (not shown).

In this embodiment, RAM 110 is of at least 4 Mbytes capacity as is conventional is modern personal computers.

Figure 2:
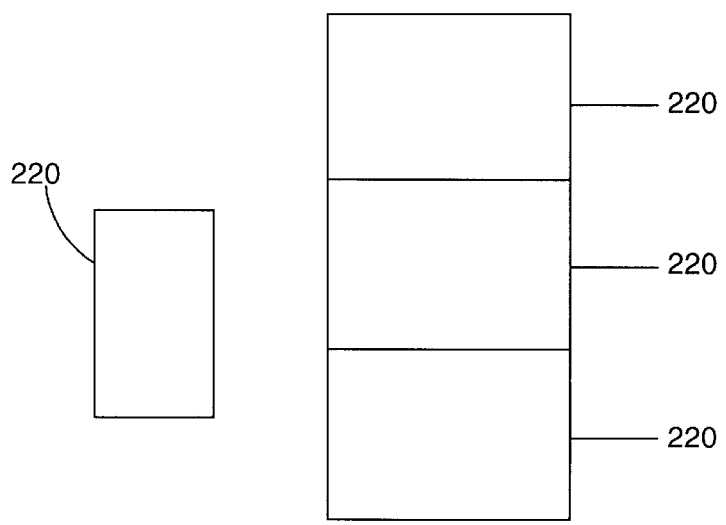
FIG. 2 is a schematic representation of the software components of an embodiment of the invention.

FIG. 2 is a schematic representation of the relevant software components of the embodiment. The overall operation of the computer is supervised and controlled in conventional fashion by an operating system 200. The system also comprises a generalized loader utility, shown in FIG. 2 at 210. Application programs 220 make use of the loader and operating system services as described in more detail below.

In this embodiment, operating system 200 is envisaged to be the PC-DOS or WINDOWS operating systems available from IBM CORPORATION and MICROSOFT CORPORATION respectively, although implementation with other operating systems is, of course, not excluded (WINDOWS is a trademark of Microsoft Corp.).

Figure 3:
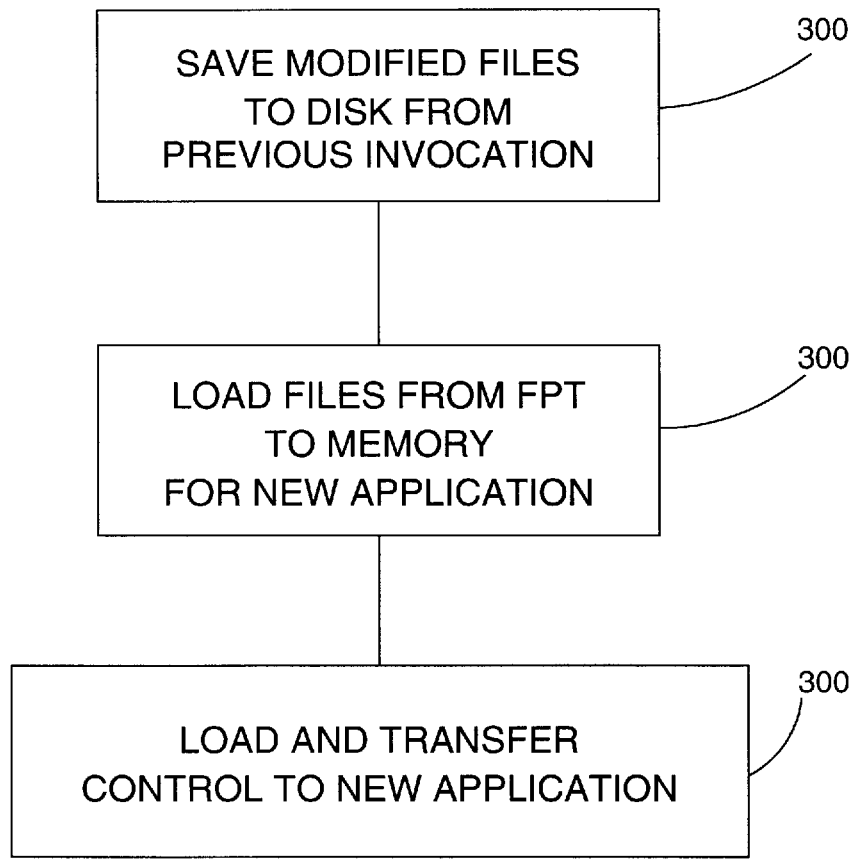
FIG. 3 is a flow diagram showing the operation of the generalised loader.

Generalised loader 210 accepts as input an application 220 to be executed. When the loader 220 is invoked it executes the following steps which are illustrated in FIG. 3:

1. For native DOS systems, it saves in step 300 to disk all modified files which were loaded or created as part of the previous invocation of the loader, if any. For a WINDOWS system, it saves to disk all modified files which were loaded or created as part of the previous invocation of the loader in the same window.
2. Loader 210 then loads in step 310 a set of files which may be used by the application, defined as to be described below, into RAM 110.
3. Loader 210 then loads the application 220 and transfers control to the application 220 in step 320.

In a preferred embodiment, the collection of files associated with any particular application is maintained in a File Preload Table 230, which is a special table used by the generalized loader. There is one entry in the FPT for each application, which consists of the application name followed by a list of files that may be used by the application. This list of files could be specified in many different ways, for example, all files with a specified file extension, such as .doc, may be loaded or all files from a specified directory could be loaded or both.

Alternatively, an explicit list of files could be used in the FPT. This arrangement would be suitable, for example, for users who want to exercise more control over their running environment.

In some embodiments, the FPT could be maintained by the application itself as, for example, a list of most recently used files or files in a specified directory which have a particular file extension which is unique to that application.

An entry of the FPT may be created as part of an installation procedure for the application and means provided by the application to update the contents of the FPT interactively. It will be clear to those skilled in the art that there are many simple ways in which this could be implemented.

In the preferred embodiment, operating system 200 provides the following support to the loader. At initial program load (IPL) time the disk directory and the FPT are loaded into the RAM 110. In PC-DOS, a special shutdown procedure in which all modified files are saved back to disk is used—this could be simply an invocation of the loader with no application. In WINDOWS, when a window session is closed all files which are currently modified only in RAM 110 by an application invoked from this window session are saved to disk. During use of an application, all reads and writes to files which are currently in memory are executed to memory without accessing the disk storage device.

It will be understood that use of the loader means that it is not possible to take advantage of the virtual memory techniques which may be available with some operating systems, since these involve the swapping of data into and out of memory. This will inevitably mean that it will not be possible to exploit the full multi-tasking functionality of such operating systems. However, it is considered that such features are not essential to mobile users—most users only wish to use one application at a time when they are on the move and using the computer under battery power.

In view of the limited memory size and the fact that modified files are not backed up to disk during use of an application, certain precautions are desirable to handle exception conditions. Two main types of exceptions are considered:

1. Memory full. This situation occurs when there is no space available to load the necessary files. This will be a relatively rare event since with modern memory systems, lack of memory space should not be a problem. The simplest solution to this problem would be to use the disk in conventional fashion when a file cannot be preloaded because memory is full. However, those skilled in the art will recognise that other memory management solutions from the domain of cache management are possible.
2. Power loss, there is a risk that if, for whatever reason, the computer loses power, all data in RAM 110, including modified files could be lost. The simplest solution to this is would be to use a non-volatile store for RAM 110. Another possibility is to equip the battery powering the computer with a low charge indication detectable by the operating system. When a low charge indication is detected, there should still be enough power left for the loader to save all modified files to disk before the computer is shut down.

The invention is applicable to the industrial field of computers. The invention has been described with respect to preferred implementations; however, variations will be suggested to those skilled in the art that are within the spirit and scope of the claimed invention.

What is claimed is:

1. A computer having a semiconductor memory; a disk data storage device of the type which automatically switches to a low power consumption mode when disk access is not required; and means for associating an application program with a plurality of data files which are usable by the application, characterised in that the computer is arranged to load the plurality of data files from the disk data storage device into the semiconductor memory before use of the application and to save at least any modified ones of the plurality of files back to the disk data storage device after use of the application so that access to the disk data storage device is not required during use of the application program.

2. A computer as claimed in claim 1 wherein the means for associating the plurality of files with the application program is a table.

3. A computer as claimed in claim 1 wherein the plurality of files are associated with an application by means of an application-specific portion of a file name.

4. A computer as claimed in claim 3 wherein the application specific portion of the file name is a suffix.

5. A computer as claimed in claim 3 wherein the semiconductor memory has a capacity of at least 4 Mbytes.

6. A computer as claimed in claim 3 which is battery-powered.

7. A computer as claimed in claim 3 which is portable.

8. A method of executing an application program in a computer having a semiconductor memory; a disk data storage device of the type which automatically switches to a low power consumption mode when disk access is not required; and means for associating an application program with a plurality of data files which are usable by the application, comprising the steps of loading the plurality of data files from the disk data storage device into the semiconductor memory before use of the application and saving at least any modified ones of the plurality of files back to the disk data storage device after use of the application so that access to the disk data storage device is not required during use of the application program.

* * * * *